(12) United States Patent
Jung et al.

(10) Patent No.: US 11,676,012 B2
(45) Date of Patent: Jun. 13, 2023

(54) ARTIFICIAL INTELLIGENCE SERVER

(71) Applicant: LG ELECTRONICS INC., Seoul (KR)

(72) Inventors: Boosoon Jung, Seoul (KR); Soora Bang, Seoul (KR); Bomi Jang, Seoul (KR); Woocheol Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 562 days.

(21) Appl. No.: 16/712,309

(22) Filed: Dec. 12, 2019

(65) Prior Publication Data
US 2021/0133560 A1   May 6, 2021

(30) Foreign Application Priority Data
Nov. 1, 2019   (KR) .................. 10-2019-0138636

(51) Int. Cl.
| *G06N 3/08* | (2023.01) |
| *G10L 15/18* | (2013.01) |
| *G06F 16/951* | (2019.01) |
| *G10L 15/26* | (2006.01) |
| *G10L 15/22* | (2006.01) |

(52) U.S. Cl.
CPC .............. *G06N 3/08* (2013.01); *G06F 16/951* (2019.01); *G10L 15/18* (2013.01); *G10L 15/22* (2013.01); *G10L 15/26* (2013.01); *G10L 2015/223* (2013.01)

(58) Field of Classification Search
None
See application file for complete search history.

(56) References Cited

U.S. PATENT DOCUMENTS

| 5,867,812 | A  | * | 2/1999 | Sassano | G06F 40/268 704/7 |
| 6,647,383 | B1 | * | 11/2003 | August | G06F 16/9535 |
| 6,789,057 | B1 | * | 9/2004 | Morimoto | G06F 40/211 704/7 |
| 9,075,792 | B2 | * | 7/2015 | Dai | G06F 40/268 |
| 10,902,197 | B1 | * | 1/2021 | Lakshmanan | G06F 40/205 |
| 2003/0233235 | A1 | * | 12/2003 | Park | G06F 40/268 704/257 |
| 2006/0100856 | A1 | * | 5/2006 | Kang | G06F 40/242 704/9 |
| 2006/0173683 | A1 | * | 8/2006 | Roth | G10L 15/183 704/251 |
| 2007/0162281 | A1 | * | 7/2007 | Saitoh | G06F 40/247 704/251 |
| 2010/0114887 | A1 | * | 5/2010 | Conway | G06F 3/0237 707/E17.014 |
| 2013/0211821 | A1 | * | 8/2013 | Tseng | G06F 40/242 704/10 |
| 2014/0244239 | A1 | * | 8/2014 | Nicholson | G06F 40/242 704/9 |
| 2014/0267045 | A1 | * | 9/2014 | Grieves | G06F 3/0237 704/10 |

(Continued)

*Primary Examiner* — Jonathan C Kim
(74) *Attorney, Agent, or Firm* — Birch, Stewart, Kolasch & Birch, LLP

(57) ABSTRACT

Disclosed herein is an artificial intelligence server which receives a user dictionary, calculates rankings of a plurality of keywords included in the user dictionary, generates a cloud user dictionary according to the rankings of the plurality of keywords, and trains a natural language processing model.

11 Claims, 10 Drawing Sheets

(56) References Cited

U.S. PATENT DOCUMENTS

| | | | | |
|---|---|---|---|---|
| 2014/0330760 A1* | 11/2014 | Meier | G06F 16/958 | 706/12 |
| 2014/0365456 A1* | 12/2014 | Lee | G06F 16/335 | 707/706 |
| 2015/0058720 A1* | 2/2015 | Smadja | H04L 67/535 | 715/271 |
| 2016/0062979 A1* | 3/2016 | Mote | G06F 16/90344 | 704/9 |
| 2016/0132485 A1* | 5/2016 | Lee | G06F 40/242 | 704/10 |
| 2016/0372117 A1* | 12/2016 | Klose | G10L 15/22 | |
| 2017/0017639 A1* | 1/2017 | Bute | H04W 8/205 | |
| 2017/0024455 A1* | 1/2017 | Powell | H04L 67/306 | |
| 2017/0133015 A1* | 5/2017 | Tomsa | G10L 15/26 | |
| 2017/0242847 A1* | 8/2017 | Li | G06F 40/42 | |
| 2017/0308792 A1* | 10/2017 | Liang | G06Q 10/02 | |
| 2018/0190269 A1* | 7/2018 | Lokeswarappa | G09B 19/06 | |
| 2018/0267957 A1* | 9/2018 | Lee | G06F 40/268 | |
| 2019/0207975 A1* | 7/2019 | Wardman | H04L 63/1483 | |
| 2019/0258704 A1* | 8/2019 | Mertens | G10L 15/22 | |
| 2021/0133560 A1* | 5/2021 | Jung | G10L 15/18 | |
| 2022/0215168 A1* | 7/2022 | Mitani | G06F 40/268 | |

* cited by examiner

ARTIFICIAL INTELLIGENCE SERVER

CROSS-REFERENCE TO RELATED APPLICATIONS

This application claims priority to Korean Patent Application No. 10-2019-0138636 filed on Nov. 1, 2019, in the Republic of Korea, the entire contents of which are hereby incorporated by reference in its entirety.

BACKGROUND

The present disclosure relates to an artificial intelligence (AI) server capable of retraining a natural language processing model, by collecting keywords used by a user and generating training data according to rankings of the keywords.

Recently, as deep learning has gained attention, natural language processing has become increasingly important in that an artificial intelligence device is allowed to understand a human language.

Natural language processing (NLP) includes technology of converting a human language into a mechanical form through various analysis methods to allow a computer to understand the human language and technology of making human-interpretable morphemes. At this time, the natural language means a language used in in daily life, such as Korean or English, which has been used for human communication.

In natural language processing, an input sentence is divided into morphemes which are the minimum units of a word for natural language processing, and the morphemes are analyzed to determine whether words are appropriately arranged in terms of grammar by syntactic analysis. Thereafter, syntactic analysis is performed by tagging a most suitable part of speech among the results obtained through morphological analysis. A natural language processing result may be acquired through the analysis result.

SUMMARY

An object of the present disclosure is to provide an artificial intelligence server capable of training a natural language processing model, by collecting keywords used by a user and generating training data according to rankings of the keywords.

An artificial intelligence server according to the present disclosure includes a communication interface configured to receive a user dictionary, and a processor configured to calculate rankings of a plurality of keywords included in the user dictionary, generate a cloud user dictionary according to the rankings of the plurality of keywords, and train a natural language processing model.

DETAILED DESCRIPTION OF THE EMBODIMENTS

Figure 1:
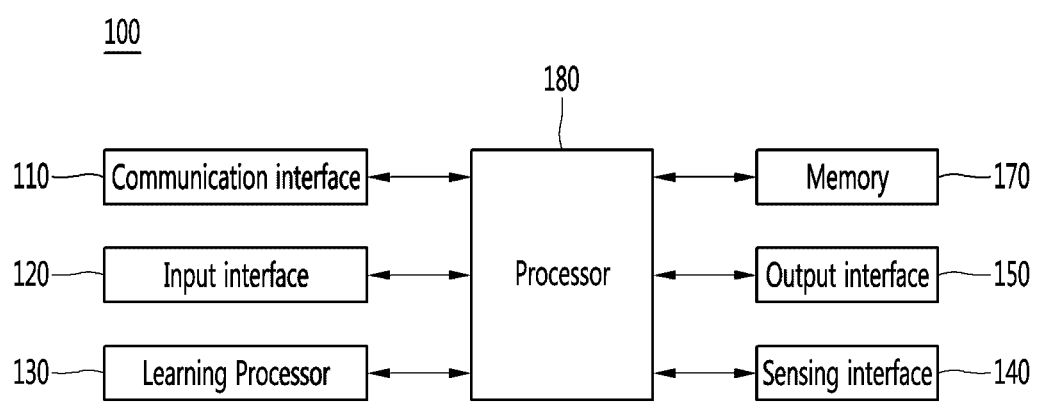
FIG. 1 is a block diagram illustrating an AI apparatus according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "interface" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving interface may include an actuator or a motor and may perform various physical operations such as moving a robot joint. In addition, a movable robot may include a wheel, a brake, a propeller, and the like in a driving interface, and may travel on the ground through the driving interface or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

Here, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 is a block diagram illustrating an AI apparatus 100 according to an embodiment of the present disclosure.

Hereinafter, the AI apparatus 100 may be referred to as a terminal.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication interface 110, an input interface 120, a learning processor 130, a sensing interface 140, an output interface 150, a memory 170, and a processor 180.

The communication interface 110 may transmit and receive data to and from external devices such as other 100a to 100e and the AI server 200 by using wire/wireless communication technology. For example, the communication interface 110 may transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 may acquire various kinds of data.

Here, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a training data for model learning and an input data to be used when an output is acquired by using learning model. The input interface 120 may acquire raw input data. Here, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

Here, the learning processor 130 may perform AI processing together with the learning processor 240 of the AI server 200.

Here, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing interface 140 may acquire at least one of internal information about the AI apparatus 100, ambient environment information about the AI apparatus 100, and user information by using various sensors.

Examples of the sensors included in the sensing interface 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

Here, the output interface 150 may include a display interface for outputting time information, a speaker for outputting auditory information, and a haptic module for outputting haptic information.

The memory 170 may store data that supports various functions of the AI apparatus 100. For example, the memory 170 may store input data acquired by the input interface 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
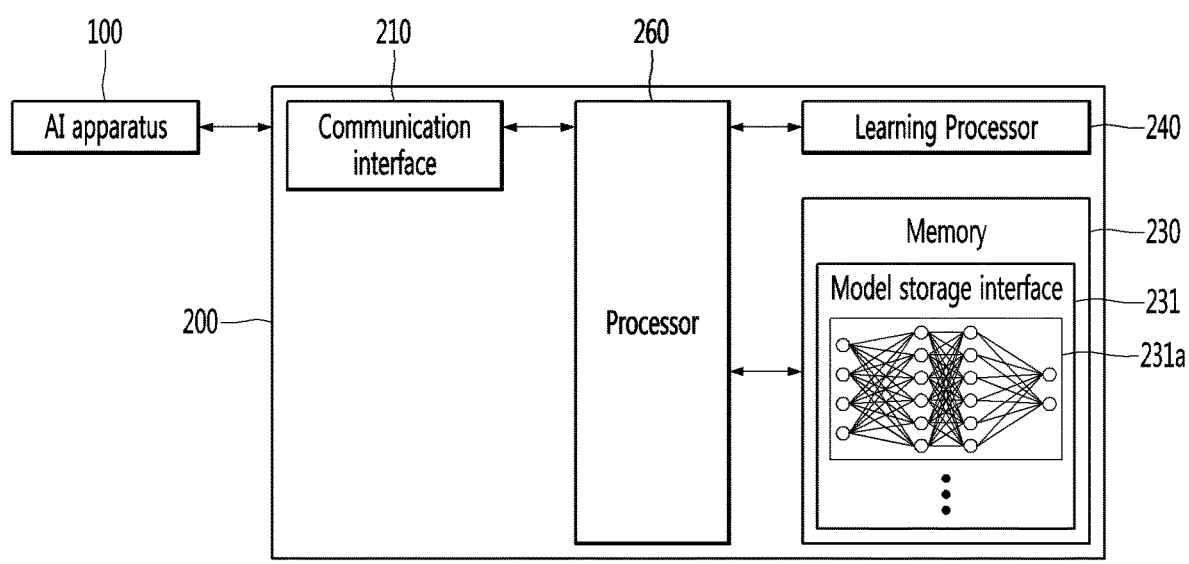
FIG. 2 is a block diagram illustrating an AI server according to an embodiment of the present disclosure.

FIG. 2 is a block diagram illustrating an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. Here, the AI server 200 may be included as a partial configuration of the AI apparatus 100, and may perform at least part of the AI processing together.

The AI server 200 may include a communication interface 210, a memory 230, a learning processor 240, a processor 260, and the like.

The communication interface 210 can transmit and receive data to and from an external device such as the AI apparatus 100.

The memory 230 may include a model storage interface 231. The model storage interface 231 may store a learning or learned model (or an artificial neural network 231a) through the learning processor 240.

The learning processor 240 may learn the artificial neural network 231a by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
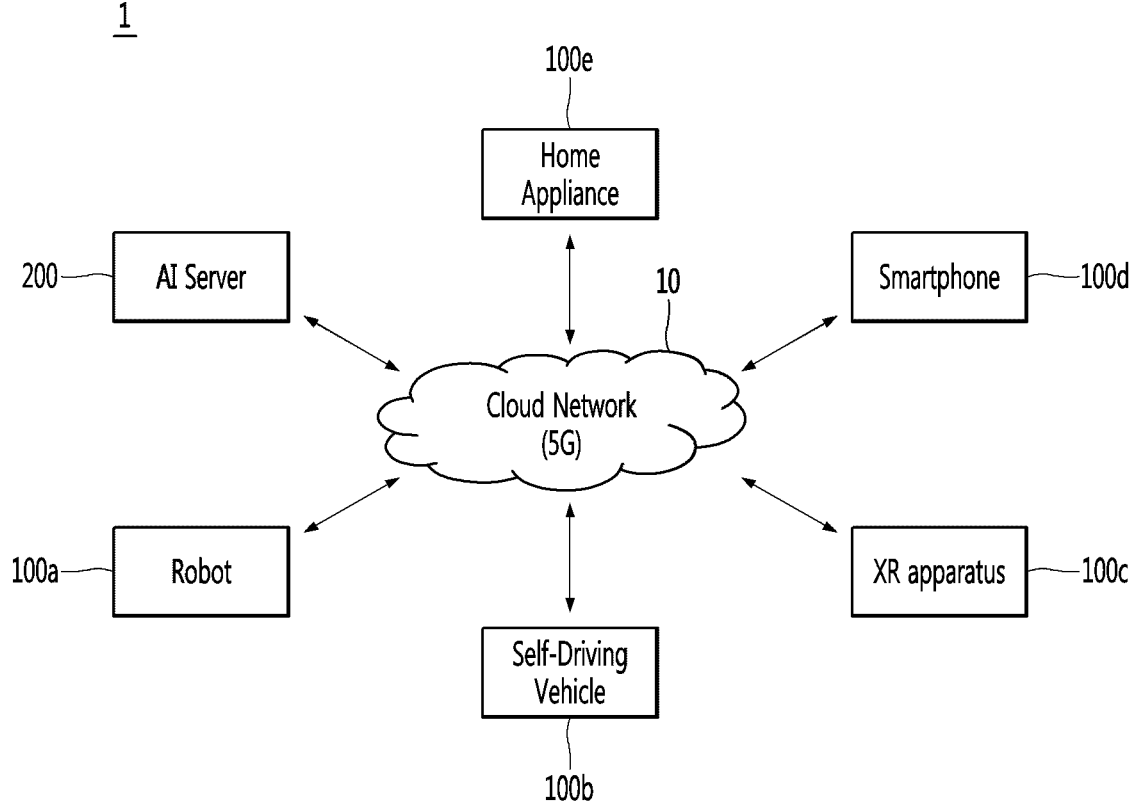
FIG. 3 is a view illustrating an AI system according to an embodiment of the present disclosure.

FIG. 3 is a view illustrating an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI apparatuses 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100a, the self-driving vehicle 100b, the XR device 100c, the smartphone 100d, or the home appliance 100e through the cloud network 10, and may assist at least part of AI processing of the connected AI apparatuses 100a to 100e.

Here, the AI server 200 may learn the artificial neural network according to the machine learning algorithm instead of the AI apparatuses 100a to 100e, and may directly store the learning model or transmit the learning model to the AI apparatuses 100a to 100e.

Here, the AI server 200 may receive input data from the AI apparatuses 100a to 100e, may infer the result value for the received input data by using the learning model, may generate a response or a control command based on the inferred result value, and may transmit the response or the control command to the AI apparatuses 100a to 100e.

Alternatively, the AI apparatuses 100a to 100e may infer the result value for the input data by directly using the learning model, and may generate the response or the control command based on the inference result.

Hereinafter, various embodiments of the AI apparatuses 100a to 100e to which the above-described technology is applied will be described. The AI apparatuses 100a to 100e illustrated in FIG. 3 may be regarded as a specific embodiment of the AI apparatus 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

Here, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external device to determine the travel route and the travel plan, and may control the driving interface such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving interface based on the control/interaction of the user. Here, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling route by using the recognized surrounding information or object information. The learning model may be learned directly from the self-driving vehicle 100a or may be learned from an external device such as the AI server 200.

Here, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external device to determine the travel route and the travel plan, and may control the driving interface such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving interface based on the control/interaction of the user. Here, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

Here, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given route without the user's control or moves for itself by determining the route by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

Here, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving interface of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

Here, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
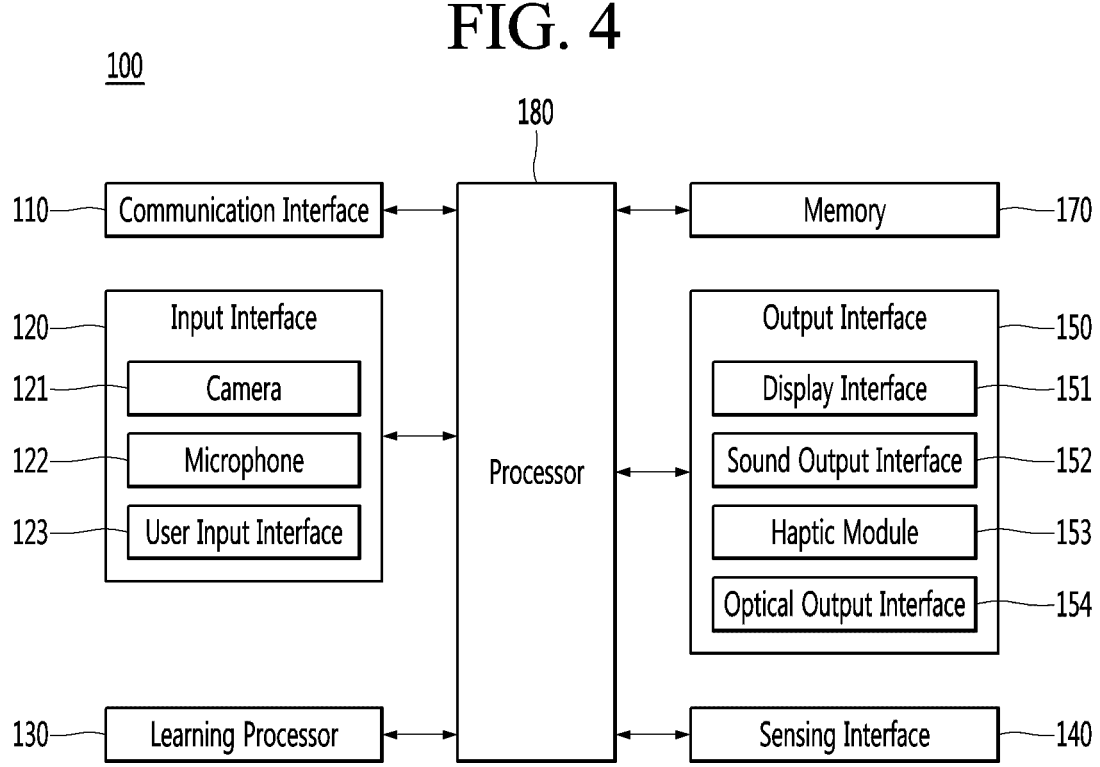
FIG. 4 is a block diagram illustrating an AI apparatus according to an embodiment of the present disclosure.

FIG. 4 is a block diagram illustrating an AI apparatus 100 according to an embodiment of the present disclosure.

The redundant repeat of FIG. 1 will be omitted below.

In the present disclosure, the AI apparatus 100 may include an edge device.

The communication interface 110 may also be referred to as a communicator.

Referring to FIG. 4, the input interface 120 may include a camera 121 for image signal input, a microphone 122 for receiving audio signal input, and a user input interface 123 for receiving information from a user.

Voice data or image data collected by the input interface 120 are analyzed and processed as a user's control command.

Then, the input interface 120 is used for inputting image information (or signal), audio information (or signal), data, or information inputted from a user and the AI apparatus 100 may include at least one camera 121 in order for inputting image information.

The camera 121 processes image frames such as a still image or a video obtained by an image sensor in a video call mode or a capturing mode. The processed image frame may be displayed on the display interface 151 or stored in the memory 170.

The microphone 122 processes external sound signals as electrical voice data. The processed voice data may be utilized variously according to a function (or an application program being executed) being performed in the AI apparatus 100. Moreover, various noise canceling algorithms for removing noise occurring during the reception of external sound signals may be implemented in the microphone 122.

The user input interface 123 is to receive information from a user and when information is inputted through the user input interface 123, the processor 180 may control an operation of the AI apparatus 100 to correspond to the inputted information.

The user input interface 123 may include a mechanical input means (or a mechanical key, for example, a button, a dome switch, a jog wheel, and a jog switch at the front, back or side of the AI apparatus 100) and a touch type input means. As one example, a touch type input means may include a virtual key, a soft key, or a visual key, which is displayed on a touch screen through software processing or may include a touch key disposed at a portion other than the touch screen.

The sensing interface 140 may also be referred to as a sensor interface.

The output interface 150 may include at least one of a display interface 151, a sound output module 152, a haptic module 153, or an optical output module 154.

The display interface 151 may display (output) information processed in the AI apparatus 100. For example, the display interface 151 may display execution screen information of an application program running on the AI apparatus 100 or user interface (UI) and graphic user interface (GUI) information according to such execution screen information.

The display interface 151 may be formed with a mutual layer structure with a touch sensor or formed integrally, so that a touch screen may be implemented. Such a touch screen may serve as the user input interface 123 providing an input interface between the AI apparatus 100 and a user, and an output interface between the AI apparatus 100 and a user at the same time.

The sound output module 152 may output audio data received from the wireless communication interface 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI apparatus 100. An example of an event occurring in the AI apparatus 100 includes message reception, call signal reception, missed calls, alarm, schedule notification, e-mail reception, and information reception through an application.

Figure 5:
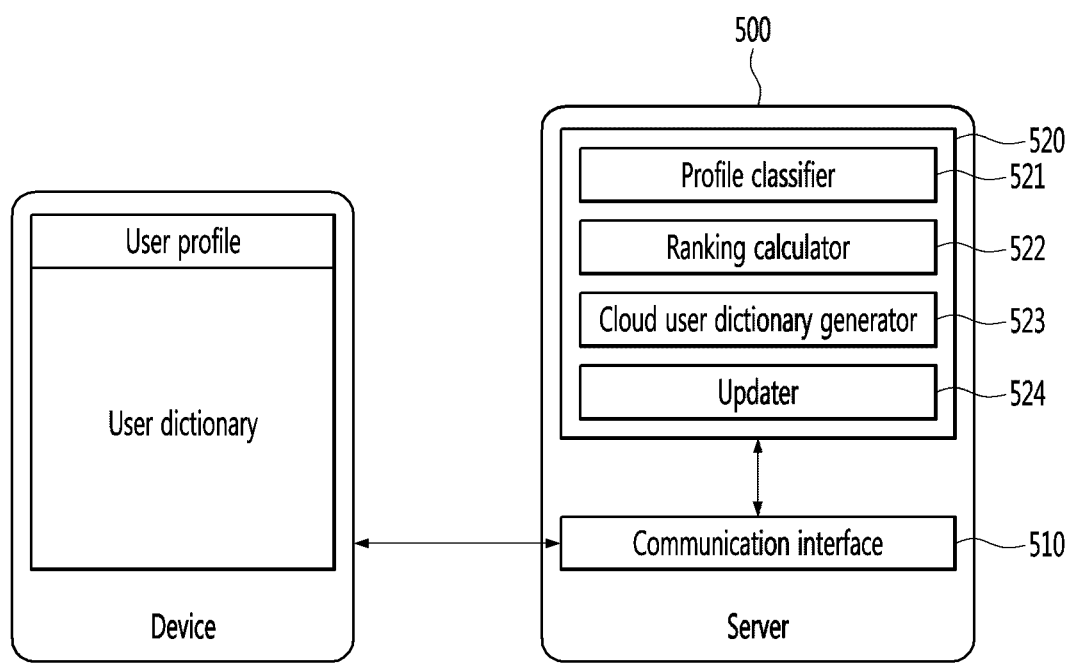
FIG. 5 is a view illustrating an artificial intelligence server 500 according to an embodiment of the present disclosure.

FIG. 5 is a view illustrating an artificial intelligence server 500 according to an embodiment of the present disclosure.

Hereinafter, the artificial intelligence server 500 of FIG. 5 may include the components of FIGS. 1 and 4 and perform the function of the artificial intelligence apparatus 100.

The repeated description of FIGS. 1 and 4 will be omitted.

Referring to FIG. 5, the artificial intelligence server 500 may include a communication interface 510 for receiving data from an external device. At this time, the external device may include a mobile device and all devices capable of performing IoT and communication.

Specifically, the data received by the communication interface 510 may include a user profile and a user dictionary generated in the external device. At this time, the user profile may include a user dictionary according to the user profile. In addition, the user dictionary may mean collecting source data related to user information via an external device used by a user and clustering the collected source data via a classification engine (not shown) by defined categories.

For example, the user profile may be data for determining whether a user marries, presence of a pet, main transportation, favorite brands, hobbies, exercise, etc. acquired via a user search history, a text reception history, Bluetooth connection history, etc.

The user dictionary may include data which is not learned in an existing natural language processing model, as data accumulated in the external device used by the user.

At this time, the natural language processing model is trained by the learning processor 130, the learning processor 240 of the AI server 200 or distributed processing thereof, and may be used interchangeable with the natural language processing engine.

Specifically, the user dictionary may include the plurality of keywords which are words not recognized in the natural language processing model. For example, when the word "Jedi" is not learned in the natural language processing model, the natural language processing model cannot accurately recognize the word "Jedi". At this time, "Jedi" may be stored in the user dictionary.

In addition, in the user dictionary, the plurality of keywords may include a third word which is a combination of a first word and a second word recognized in the natural language processing model. For example, when the word "Pocket Monster" is not learned in the natural language processing model, the natural language processing model may recognize a first word "pocket" and a second word "monster" and cannot accurately recognize a third word "Pocket Monster". At this time, "Pocket Monster" may be stored in the user dictionary.

In addition, the user dictionary may include a set generated by acquiring, as a keyword, a third word which is a combination of a first word which is not recognized in the natural language processing model and a second word recognized in the natural language processing model.

For example, when a word "Pla model" is not learned in the natural language processing model, the natural language processing model cannot accurately recognize a third word "Pla model". Meanwhile, the natural language processing model cannot accurately recognize a first word "Pla" and can recognize a second word "model". At this time, "Pla model" may be stored in the user dictionary.

The user dictionary may be divided and stored according to the clustered user profile.

That is, the external device may receive the voice of the user and input the received voice to the natural language processing model. At this time, the external device may store a word, which is not recognized in the natural language processing model, in the user dictionary. The external device may communicate with the artificial intelligence server 500 and transmit the user profile and the user dictionary to the artificial intelligence server 500.

According to one embodiment of the present disclosure, when the communication interface 510 receives the user dictionary according to the user profile, the processor 520 may acquire data from the communication interface 510 and classify the data received via the communication interface 510.

Specifically, the processor 520 may acquire the user profile via the communication interface 510. In addition, the processor 520 may include a profile classifier 521 for classifying the acquired user profile. The profile classifier 521 may classify at least one user profile by the same user profile.

According to one embodiment of the present disclosure, the processor 520 may collect a plurality of keywords included in a plurality of user dictionaries corresponding to the same user profile and calculate rankings of the plurality of keywords. Specifically, the processor 520 may calculate the rankings of the collected keywords included in the user dictionary using a ranking calculator 522.

According to one embodiment of the present disclosure, the processor 520 may acquire the rankings of the keywords calculated in the ranking calculator 522 and generate a cloud user dictionary. Specifically, a cloud user dictionary generator 523 may acquire keywords having a specific ranking or higher from the plurality of keywords and generate the cloud user dictionary.

According to one embodiment of the present disclosure, the processor 520 may train the natural language processing model using the dictionary generated in the cloud user dictionary generator 523. Specifically, an updater 524 may train the natural language processing model using the cloud user dictionary, thereby improving performance of the natural language processing model.

According to one embodiment of the present disclosure, the processor 520 may control the communication interface 510 to transmit the improved natural language processing model.

Hereinafter, the flowchart of the present disclosure will be described with reference to FIG. 6.

Figure 6:
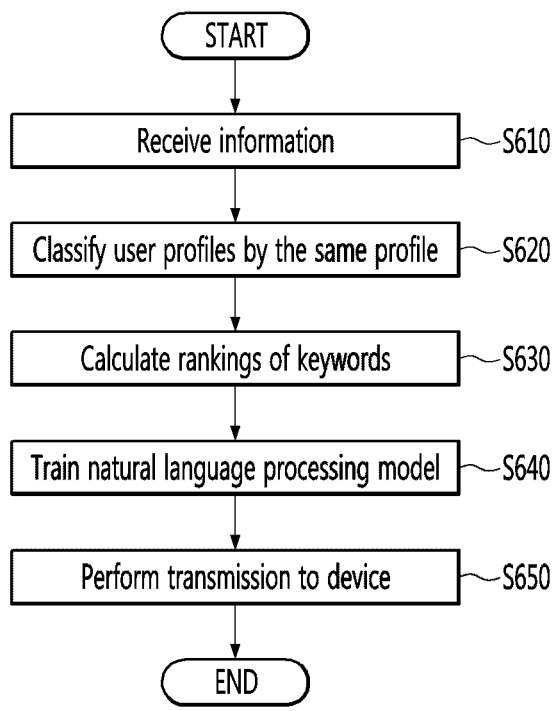
FIG. 6 is a flowchart illustrating an embodiment of the present disclosure.

FIG. 6 is a flowchart illustrating an embodiment of the present disclosure.

Referring to FIG. 6, the communication interface 510 of the artificial intelligence server 500 may receive the user dictionary from the external device. At this time, the user dictionary may include the user dictionary according to the user profile. In addition, the communication interface 510 may receive at least one user profile. The processor 520 of the artificial intelligence server 500 may acquire the acquired information from the communication interface 510 (S610).

At this time, the acquired information may include at least one user profile and the user dictionary according to the profile. In addition, the user profile may mean that source data related to user information is collected using a device used by a user and the collected source data is clustered by the defined category via a classification engine (not shown).

The user dictionary may include data which is not learned in the existing natural language processing model, as data accumulated in the external device used by the user.

According to one embodiment of the present disclosure, the processor 520 may classify the acquired one or more user profiles by the same user profile (S620). Specifically, the communication interface 510 may receive a plurality of user dictionaries included in a plurality of user profiles and the processor 520 may classify the plurality of acquired user profiles by the same user profile.

In addition, the processor 520 may collect the plurality of user dictionaries included in the same user profile. The processor 520 may acquire a plurality of keywords included in the collected the user dictionary.

According to one embodiment of the present disclosure, the processor 520 may calculate the rankings of the plurality of acquired keywords (S630). Specifically, the processor 520 may calculate the rankings of the plurality of keywords acquired from the same user profile. At this time, the method of calculating the rankings of the plurality of keywords may include a method of calculating the rankings of the plurality of keywords by giving a high score to a keyword which is frequently detected in the user dictionary. Hereinafter, this will be described in detail with reference to FIG. 7.

According to one embodiment of the present disclosure, the processor 520 may train the natural language processing model according to the rankings of the plurality of acquired keywords (S640). At this time, the natural language processing model may include a plurality of natural language processing models generated in correspondence with the user profiles. In addition, the natural language processing model may be one combined natural language processing model. The processor 520 may acquire the updated natural language processing model via the above-described process.

According to one embodiment of the present disclosure, the processor 520 may control the communication interface 510, in order to transmit the updated natural language processing model to the external device (S650).

Hereinafter, the method of calculating the rankings of the keywords in S630 will be described in detail.

Figure 7:
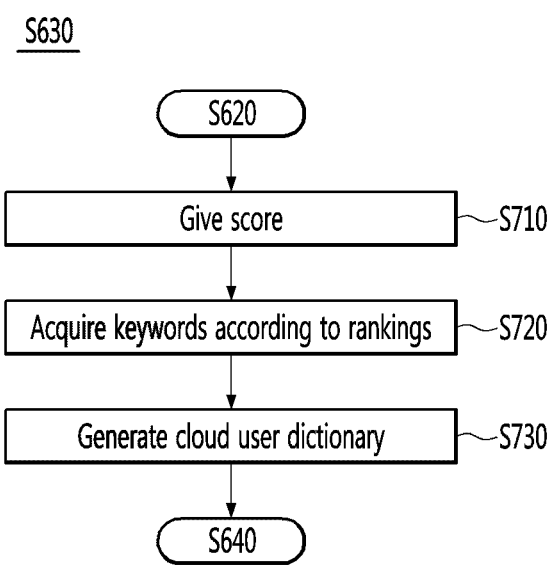
FIG. 7 is a flowchart illustrating an embodiment of the present disclosure.

FIG. 7 is a flowchart illustrating an embodiment of the present disclosure.

Referring to FIG. 7, the processor 520 may calculate the rankings of the plurality of acquired keywords (S630). Specifically, the processor 520 may give a score to each of the plurality of keywords (S710). At this time, the processor may calculate the rankings of the plurality of keywords, by giving a high score to a keyword which is frequently detected in the user dictionary.

That is, a low score may be given to a keyword which is infrequently detected in the user dictionary. In addition, the plurality of keywords includes a first keyword and a second keyword, and, when the first keyword is more frequently detected in the user dictionary than the second keyword, the score of the first keyword may be higher than that of the second keyword.

The processor 520 may give a score to each of the plurality of keywords and calculate the rankings of the keywords in descending order of score. In addition, keywords having a specific ranking or higher may be acquired from among the plurality of calculated keywords and keywords according to the ranking may be acquired (S720). At this time, the specific ranking may be a predetermined ranking value. In addition, the specific ranking may include the case of having a predetermined score or higher.

For example, assume that the keywords according to the user profile are "A=90 points", "B=80 points", "C=70 points" and "D=60 points". When the specific ranking is a predetermined ranking value and the ranking value is "third place", the keywords according to the ranking may be A, B and C.

In addition, when the specific ranking is the predetermined score or higher and the score is set to "60 points or higher", the keywords according to the ranking may be A, B, C and D.

According to one embodiment of the present disclosure, the processor 520 may generate the cloud user dictionary including keywords having the specific ranking or higher among the plurality of keywords (S730).

The processor 520 may train the natural language processing model using the generated cloud user dictionary (S640).

Hereinafter, a detailed scenario will be described in detail with reference to FIGS. 8 to 10.

Figure 8:
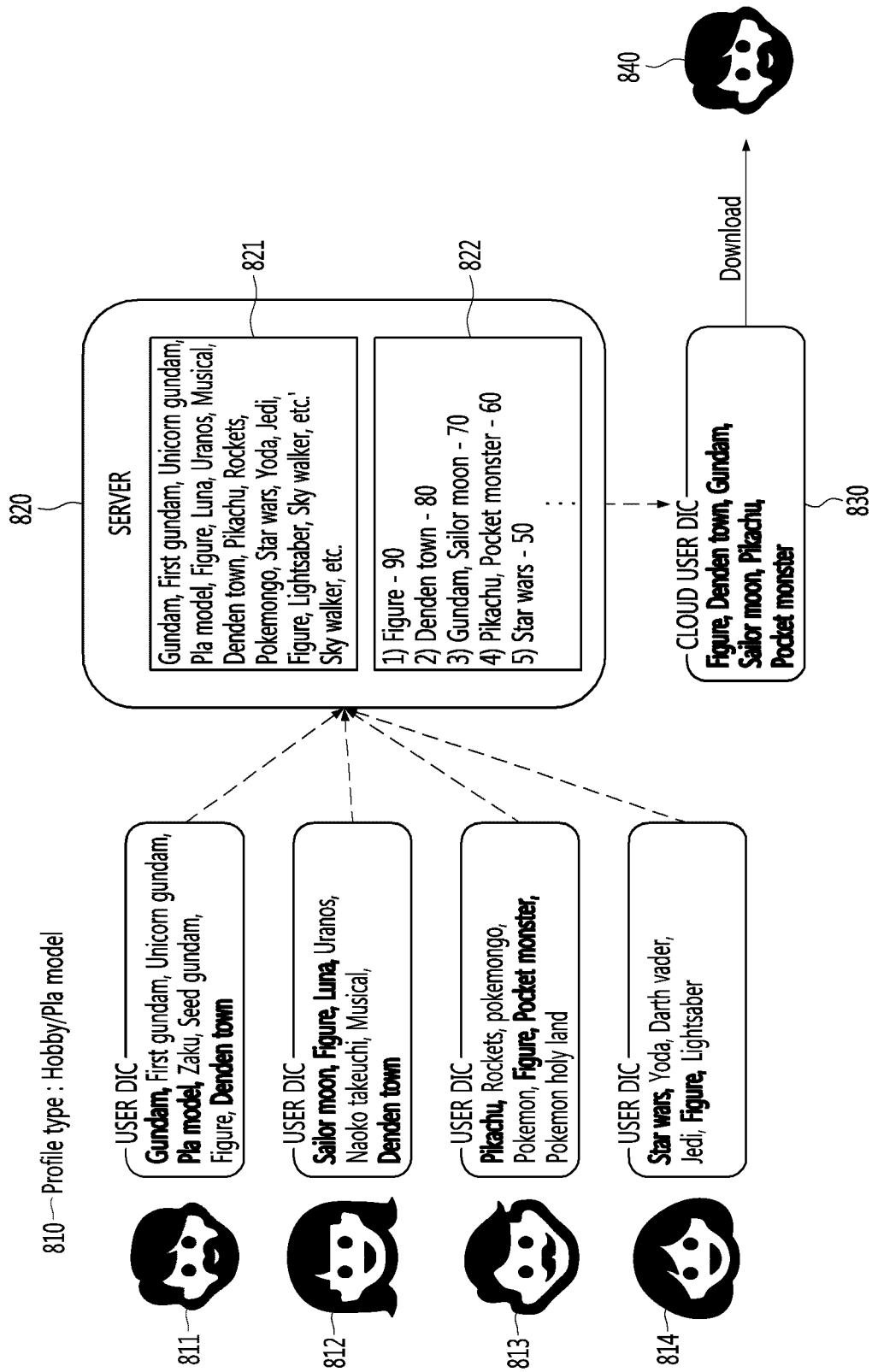
FIG. 8 is a view showing an example of a profile according to an embodiment of the present disclosure.
Figure 9:
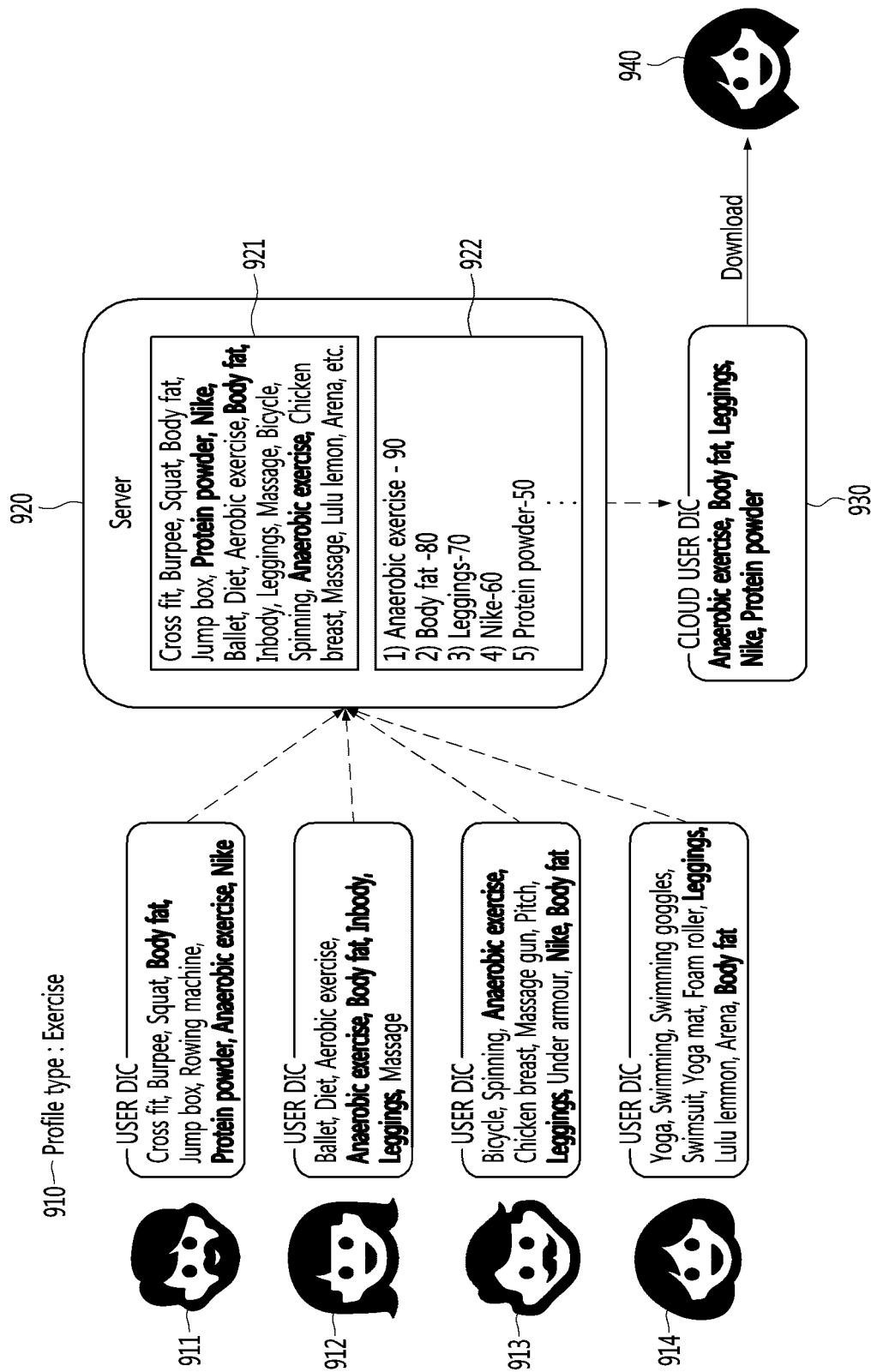
FIG. 9 is a view showing an example of a profile according to an embodiment of the present disclosure.

FIGS. 8 and 9 are views showing an example of a profile according to an embodiment of the present disclosure.

Referring to FIGS. 8 to 9, the artificial intelligence servers 820 and 920 may receive data from external devices 811, 812, 813 and 814 respectively used by a plurality of users.

Specifically, the data received by the communication interface 510 may include "hobby/Pla model" as the user profile generated in the external devices 811, 812, 813 and 814. In addition, the data received by the communication interface 510 may include a user dictionary according to "hobby/Pla model" profile.

For example, the keywords included in the user dictionary of the first external device 811 may include "Gundam", "Unicorn Gundam", "Zaku", "Seed Gundam", "Figure", "Denden Town", etc.

In another example, the data received by the communication interface 510 may include "exercise" as the user profile generated in each of the external devices 911, 912, 913 and 914. In addition, the data received by the communication interface 510 may include a user dictionary according to the "exercise" profile.

For example, the keywords included in the user dictionary of the first external device 911 may include "cross fit", "burpee", "squat", "body fat", "jump box", "rowing machine", "protein powder", "anaerobic exercise", "Nike", etc.

As in the above example, the user dictionary may be divided and stored according to the clustered user profile.

According to one embodiment of the present disclosure, the processor 520 may classify the data received by the communication interface 510.

Specifically, the processor 520 may acquire at least one user profile such as "hobby/Pla model" and "exercise", and classify the acquired user profile by the same user profile.

For example, the processor 520 may classify the acquired user profile as a "hobby/Pla model" profile (the external devices 811 to 814) and an "exercise" profile (the external devices 911 to 914). The processor 520 may collect the plurality of keywords included in each user dictionary according to the same user profile.

For example, the processor may acquire, from the "hobby/Pla model" profile, a set 821 of a plurality of collected keywords included in the user dictionary of each of the external devices 811 to 814 of the users. In addition, the processor may acquire, from "exercise" profile, a set 921 of a plurality of collected keywords included in the user dictionary of each of the external devices 911 to 914 of the users.

The processor may calculate the rankings of the plurality of keywords included in the sets 821 and 921. The processor may calculate the rankings of the keyword in descending order of score, by giving a high score to a keyword which is frequently detected.

For example, in the case of the set 821 collected from the "hobby/Pla model" profile, the rankings of the plurality of keywords listed in order of being frequently detected in the external devices 811 to 814 are represented by 1) Figure, 2) Denden Town, 3) Gundam and Sailor Moon, and 4) Pikachu and Pocket Monster. Therefore, the processor may acquire a set 922 of the rankings of "hobby/Pla model" profile.

In addition, in the case of the set 921 of the "exercise" profile, the rankings of the plurality of keywords in order of being frequently detected in the external devices 911 to 914 may be represented by 1) anaerobic exercise, 2) body fat, 3) leggings, 4) Nike, and 5) protein powder. Therefore, the processor may acquire the set 922 of the rankings of the "exercise" profile.

The processor may acquire keywords having a specific ranking or higher among the calculated rankings of the keywords and acquires the keywords according to the rankings, in order to generate the cloud user dictionary. At this time, the specific ranking may be a predetermined ranking value. In addition, the specific ranking may include the case of having a predetermined score or higher.

For example, assume that the keywords according to the "hobby/Pla model" profile are "Figure=90 points", "Denden Town=80 points", "Gundam and Sailor Moon=70 points" and "Pikachu and Pocket Monster=60 points". When the specific ranking is a predetermined ranking value and the ranking value is set to "third place", the keywords according to the ranking are Figure, Gundam, Sailor Moon, Pikachu and Pocket Monster. In addition, when the specific ranking is a predetermined score or higher and the score is set to "70 points or higher", the keywords according to the ranking may be Figure, Denden Town, Gundam and Sailor Moon. The same method may be performed even in the "exercise" profile.

According to one embodiment of the present disclosure, the processor 520 may generate cloud user dictionaries 830 and 930, by acquiring the keywords according to the specific ranking.

For example, when the specific ranking value is set to "fourth place" in the "hobby/Pla model" profile, the cloud user dictionary 830 may include Figure, Denden Town, Gundam, Sailor Moon, Pikachu and Pocket Monster as members.

In addition, in the "exercise" profile, the specific ranking value is set to "fifth place", the cloud user dictionary 930 may include anaerobic exercise, body fat, leggings, Nike, and protein powder as members.

The processor 520 may train the natural language processing model using the generated user dictionary. In addition, the processor 520 may control the communication interface 510 to transmit the improved natural language processing model to the user having the same profile.

For example, the natural language processing model may be trained using the keywords included in the user dictionary 830 generated in the "hobby/Pla model" profile, and the improved natural language processing model may be transmitted to the external device 840 of the user having the "hobby/Pla model" profile.

In addition, the natural language processing model may be trained using the keywords included in the user dictionary 930 generated in the "exercise" profile, and the improved natural language processing model may be transmitted to the external device 940 of the user having the "exercise" profile.

Figure 10:
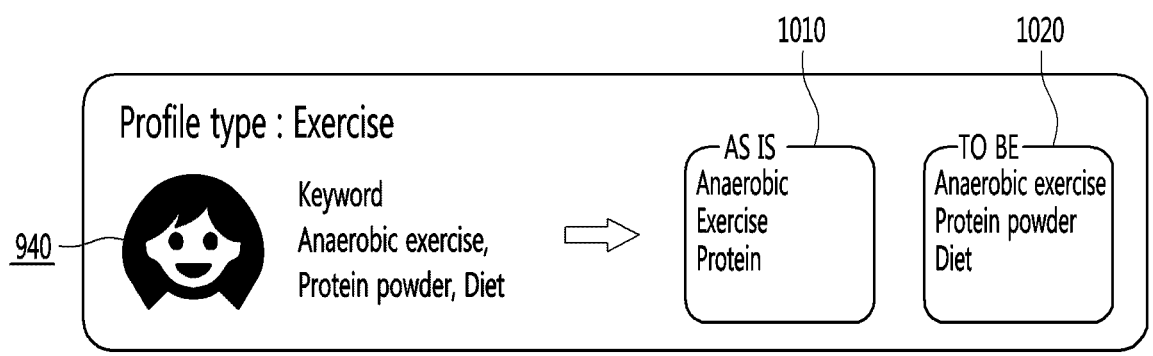
FIG. 10 is a view illustrating a natural language processing model according to an embodiment of the present disclosure.
Figure 10:
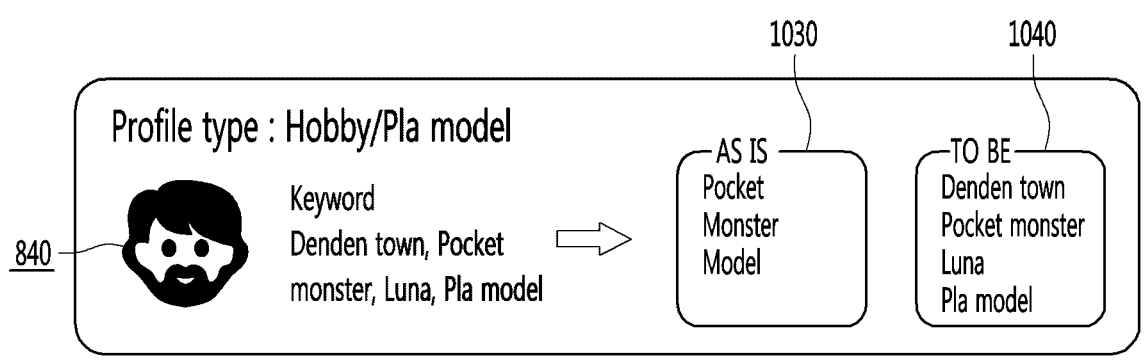

FIG. 10 is a view illustrating a natural language processing model according to an embodiment of the present disclosure.

Referring to FIG. 10, an existing natural language processing model and a natural language processing result in the external devices 840 and 940 of the user who receives the natural language processing model improved by the "hobby/Pla model" or "exercise" profile are shown.

Specifically, when anaerobic exercise, protein powder and diet are input as keywords to the device 940 corresponding to "exercise" profile, the existing natural language processing model may recognize anaerobic, exercise, protein and powder (1010). At this time, the user dictionary may include a set generated by acquiring, as keywords, words which are not recognized in the natural language processing model.

For example, when the word "diet" is not learned in the existing natural language processing model, the natural language processing model cannot accurately recognize the word "diet". At this time, "diet" may be stored in the user dictionary.

In addition, the user dictionary may include a set generated by acquiring, as a keyword, a third word which is a combination of a first word and a second word recognized in the natural language processing model. For example, when the word "anaerobic exercise" is not learned in the natural language processing model, the natural language processing model may recognize the first word "anaerobic" and the second word "exercise" but cannot accurately recognize the third word "anaerobic exercise". At this time, "anaerobic exercise" may be stored in the user dictionary.

In addition, a set generated by acquiring, as a keyword, the third word which is a combination of the first word, which is not recognized in the natural language processing model, and the second word recognized in the natural language processing model may be included.

For example, assume that, when the word "protein powder" is not learned in the natural language processing model, the natural language processing model cannot accurately recognize the first word "powder" and can recognize the second word "protein".

At this time, the natural language processing model cannot accurately recognize the third word "protein power". Therefore, "protein powder" may be stored in the user dictionary.

In contrast, the external devices 840 and 940 which have received the improved natural language processing model may accurately recognize anaerobic exercise, protein powder and diet in the "exercise" profile (1020).

The above process is equally performed even in the hobby/Pla model and the external device which has received the improved natural language processing model may accurately recognize "Denden Town", "Pocket Monster", "Luna", and "Pla model" (1040).

The present disclosure may include a natural language processing method including receiving a user dictionary, calculating rankings of a plurality of keywords included in the user dictionary, generating a cloud user dictionary according to the rankings of the plurality of keywords, and training a natural language processing model using the generated cloud user dictionary.

In addition, the calculating of the rankings of the plurality of keywords included in the user dictionary may include calculating the rankings of the plurality of keywords, by giving a high score to a keyword which is frequently detected in the user dictionary.

In addition, the generating of the cloud user dictionary according to the rankings of the plurality of keywords may include generating the cloud user dictionary including keywords having a specific ranking or higher among the plurality of keywords.

In addition, the receiving of the user dictionary includes receiving a plurality of user dictionaries included in a plurality of user profiles, and the calculating of the rankings of the plurality of keywords included in the user dictionary may include classifying the plurality of user profiles by the same user profile, collecting a plurality of user dictionaries included in the same user profile, and calculating the rankings of the plurality of keywords included in the plurality of collected user dictionaries.

In addition, the user dictionary may include the plurality of keywords which are words not recognized in the natural language processing model.

In addition, the plurality of keywords may include a third word which is a combination of a first word and a second word recognized in the natural language processing model.

The plurality of keywords may include a third word which is a combination of a first word which is not recognized in the natural language processing model and a second word recognized in the natural language processing model.

The method may further include transmitting the natural language processing model trained via the cloud user dictionary.

The natural language processing method may be used interchangeably with the method of operating the artificial intelligence server.

In the present disclosure, the step may be used interchangeably with operation. In addition, some of the steps may be omitted and the order of operations may be changed.

According to the present disclosure, it is possible to improve accuracy of a natural language processing model and to effectively manage capacity, by enabling a natural language processing model to learn keywords having a specific ranking or higher among a plurality of keywords included in a user dictionary.

Flowcharts according to the present disclosure may be performed regardless of the order or concurrently. That is, they are not constrained in time-series order.

Other implementations are within the scope of the following claims

According to an embodiment of the present disclosure, the above-described method may be implemented as a processor-readable code in a medium where a program is recorded. Examples of a processor-readable medium may include hard disk drive (HDD), solid state drive (SSD), silicon disk drive (SDD), read-only memory (ROM), random access memory (RAM), CD-ROM, a magnetic tape, a floppy disk, and an optical data storage device.

What is claimed is:

1. An artificial intelligence server, comprising:
   a communication interface configured to receive a plurality of user dictionaries included in a plurality of user profiles; and
   a processor including a profile classifier, a ranking calculator, a cloud user dictionary generator, and an updater;
   the processor configured to:
   classify the plurality of user profiles by a same user profile using the profile classifier,
   calculate rankings of a plurality of keywords included in the user dictionary corresponding to the same user profile using the ranking calculator,
   generate a cloud user dictionary including keywords having a specific ranking or higher according to the rankings of the plurality of keywords using the cloud user dictionary generator, and
   train a natural language processing model using the cloud user dictionary through the updater,
   wherein the specific ranking is a predetermined ranking value having a specific score, and
   all keywords included in the cloud user dictionary have a value greater than or equal to the predetermined ranking value,
   wherein the cloud user dictionary includes a first keyword, a first combination keyword, and a second combination keyword corresponding a specific profile among the plurality of user profiles,
   the first keyword is a keyword which is not recognized in the natural language processing model,
   the first combination keyword is a combination of the first keyword which is not recognized in the natural language processing model and a second keyword recognized in the natural language processing model, and
   the second combination keyword is a combination of the second keyword and a third keyword recognized in the natural language processing model, and
   wherein the natural language processing model is trained by using the first keyword, the first combination keyword, and the second combination keyword corresponding to the specific profile among the plurality user profiles to generate a trained natural language processing model, and
   the trained natural language processing model is transmitted to an external device of a user corresponding to the specific profile through the communication interface.

2. The artificial intelligence server of claim 1, wherein the processor is configured to calculate the rankings of the plurality of keywords, by giving a high score to a keyword which is frequently detected in the user dictionary.

3. The artificial intelligence server of claim 1, wherein the user dictionary includes the plurality of keywords which are words not recognized in the natural language processing model.

4. The artificial intelligence server of claim 3, wherein the plurality of keywords includes a third word which is a combination of a first word and a second word recognized in the natural language processing model.

5. The artificial intelligence server of claim 3, wherein the plurality of keywords includes a third word which is a combination of a first word which is not recognized in the natural language processing model and a second word recognized in the natural language processing model.

6. A method of operating an artificial intelligence server having a communication interface and a processor including a profile classifier, a ranking calculator, a cloud user dictionary generator, and an updater, the method comprising:
   receiving a plurality of user dictionaries included in a plurality of user profiles through the communication interface;
   classifying the plurality of user profiles by a same user profile through the profile classifier;
   calculating rankings of a plurality of keywords included in the user dictionary corresponding to the same user profile through the ranking calculator;
   generating a cloud user dictionary including keywords having a specific ranking or higher according to the rankings of the plurality of keywords through the cloud user dictionary generator; and
   training a natural language processing model using the generated cloud user dictionary through the updater,
   wherein the specific ranking is a predetermined ranking value having a specific score, and
   all keywords included in the cloud user dictionary have a value greater than or equal to the predetermined ranking value,
   wherein the cloud user dictionary includes a first keyword, a first combination keyword, and a second combination keyword corresponding a specific profile among the plurality of user profiles,
   the first keyword is a keyword which is not recognized in the natural language processing model,
   the first combination keyword is a combination of the first keyword which is not recognized in the natural language processing model and a second keyword recognized in the natural language processing model, and
   the second combination keyword is a combination of the second keyword and a third keyword recognized in the natural language processing model, and wherein the natural language processing model is trained by using the first keyword, the first combination keyword, and the second combination keyword corresponding to the specific profile among the plurality of user profiles to generate a trained natural language processing model, and the trained natural language processing model is transmitted to an external device of a user corresponding to the specific profile through the communication interface.

7. The method of claim 6, wherein the calculating of the rankings of the plurality of keywords included in the user dictionary includes calculating the rankings of the plurality of keywords, by giving a high score to a keyword which is frequently detected in the user dictionary.

8. The method of claim 6, wherein the user dictionary includes the plurality of keywords which are words not recognized in the natural language processing model.

9. The method of claim 8, wherein the plurality of keywords includes a third word which is a combination of a first word and a second word recognized in the natural language processing model.

10. The method of claim 8, wherein the plurality of keywords includes a third word which is a combination of a first word which is not recognized in the natural language processing model and a second word recognized in the natural language processing model.

11. An artificial intelligence server, comprising:
a communication interface configured to receive a plurality of user dictionaries included in a plurality of user profiles corresponding to a plurality of users from a plurality of external devices, each of the plurality of external devices corresponding to a different user among the plurality of users; and
a processor including a profile classifier, a ranking calculator, a cloud user dictionary generator, and an updater;
the processor configured to:
collect keywords from at least two different users corresponding to at least two user profiles,
classify the plurality of user profiles based on the at least two user profiles among the plurality of user profiles using the profile classifier,
calculate rankings of the keywords from the at least two different users corresponding to the at least two user profiles using the ranking calculator,
generate a cloud user dictionary including the keywords collected from the at least two different users corresponding to the at least two user profiles and having a specific ranking or higher according to the rankings of the keywords using the cloud user dictionary generator, and
train a natural language processing model using the cloud user dictionary through the updater,
wherein the specific ranking is a predetermined ranking value having a specific score, and
all keywords included in the cloud user dictionary have a value greater than or equal to the predetermined ranking value,
wherein the cloud user dictionary includes a first keyword, a first combination keyword, and a second combination keyword corresponding to the at least two user profiles,
the first keyword is a keyword which is not recognized in the natural language processing model,
the first combination keyword is a combination of the first keyword which is not recognized in the natural language processing model and a second keyword recognized in the natural language processing model, and
the second combination keyword is a combination of the second keyword and a third keyword recognized in the natural language processing model, and
wherein the natural language processing model is trained by using the first keyword, the first combination keyword, and the second combination keyword corresponding to the specific profile among the plurality user profiles to generate a trained natural language processing model, and
the trained natural language processing model is transmitted to an external device corresponding to at least one of the two different users through the communication interface.

\* \* \* \* \*